United States Patent [19]

Pyke et al.

[11] Patent Number: 5,239,004

[45] Date of Patent: Aug. 24, 1993

[54] POLYETHER ESTER AMIDE-SULFUR VULCANIZED RUBBER COMPOUNDS

[75] Inventors: James B. Pyke, Akron; Richard G. Bauer, Kent, both of Ohio

[73] Assignee: The Goodyear Tire & Rubber Company, Akron, Ohio

[21] Appl. No.: 913,324

[22] Filed: Jul. 15, 1992

[51] Int. Cl.$^5$ .................. C08F 8/30; C08L 33/14; C08L 35/00

[52] U.S. Cl. .................. 525/184; 525/179; 525/66

[58] Field of Search .................. 525/179, 184, 66

[56] References Cited

U.S. PATENT DOCUMENTS

| | | | |
|---|---|---|---|
| 4,208,493 | 6/1980 | Deleens et al. | 525/420 |
| 4,230,838 | 10/1980 | Foy et al. | 525/408 |
| 4,252,920 | 2/1981 | Deleens et al. | 525/430 |
| 4,361,680 | 11/1982 | Borg et al. | 525/420 |
| 4,513,123 | 4/1985 | Day et al. | 525/332.6 |
| 4,535,119 | 8/1985 | Tanibuchi et al. | 524/496 |
| 4,661,563 | 4/1987 | Sasaki et al. | 525/179 |
| 4,698,242 | 10/1987 | Salerno | 427/208.2 |
| 4,708,987 | 11/1987 | Hergenrother et al. | 525/184 |
| 4,937,290 | 6/1990 | Bauer et al. | 525/184 |
| 4,970,274 | 11/1990 | Chacko et al. | 525/432 |

FOREIGN PATENT DOCUMENTS

| | | |
|---|---|---|
| 0140372 | 10/1984 | European Pat. Off. . |
| 0251792 | 7/1987 | European Pat. Off. . |
| 62-198786048 | 8/1988 | Japan . |

OTHER PUBLICATIONS

Flesher, J. R., *Modern Plastics*, "Polyether Block Amide: High Performance TPE", Sep. 1987.

*Primary Examiner*—James J. Seidleck
*Assistant Examiner*—I. Zemel
*Attorney, Agent, or Firm*—Bruce J. Hendricks

[57] ABSTRACT

This invention discloses a unique blend of polyether ester amide and sulfur vulcanized rubber having higher modulus than the rubber component without sacrificing other properties of the rubber component.

8 Claims, No Drawings

POLYETHER ESTER AMIDE-SULFUR VULCANIZED RUBBER COMPOUNDS

BACKGROUND OF THE INVENTION

It is sometimes desirable to increase the modulus of rubber compounds. For instance, it is generally desirable to increase the modulus of rubber compounds which are utilized in tire tread base compositions and in tire wire coat compounds. A higher degree of stiffness in such rubber compositions is conventionally attained by incorporating larger amounts of fillers, such as carbon black, into the rubber compounds and/or by increasing the state of cure of such compounds. Unfortunately, both of these techniques lead to undesirable results. For instance, the incorporation of additional carbon black into rubber compounds typically leads to high levels of hysteresis. Accordingly, the utilization of such compounds in tires results in excessive heat build-up and poor cut growth characteristics. The utilization of high amounts of sulfur to attain a high state of cure typically leads to poor aging resistance. Furthermore, it is highly impractical to reach high levels of stiffness by increased state of cure alone. For these reasons, it is not possible to attain the desired degree of stiffness in tire tread base compounds by simply adding higher levels of fillers or curatives.

SUMMARY OF THE INVENTION

The subject invention discloses a unique polyether ester amide-sulfur vulcanized rubber compound. This compound is better suited for applications where a high degree of stiffness is desirable. However, the properties exhibited by this compound do not generally sacrifice other desirable characteristics of the rubber. For instance, the compounds of this invention have an increased modulus but do not have an increased degree of hysteresis.

DETAILED DESCRIPTION OF THE INVENTION

There is disclosed a sulfur vulcanized rubber compound comprising:
(a) a sulfur vulcanized rubber; and
(b) from about 5 to 60 phr of a polyether ester amide.

The sulfur vulcanized rubber which may be used in the composition of the present invention must contain some saturation (contains double bonds). The rubbers which are modified in accordance with this invention typically contain repeat units which are derived from diene monomers, such as conjugated diene monomers and/or nonconjugated diene monomers. Such conjugated and nonconjugated diene monomers typically contain from 4 to about 12 carbon atoms and preferably contain from 4 to about 8 carbon atoms. Some representative examples of suitable diene monomers include 1,3-butadiene, isoprene, 2,3-dimethyl-1,3-butadiene, 2-methyl-1,3-pentadiene, 3,4-dimethyl 1,3-hexadiene, 4,5-diethyl-1,3-octadiene, phenyl 1,3-butadiene and the like. The polydiene rubber can also contain various vinyl aromatic monomers, such as styrene, 1-vinylnaphthalene, 2,3-vinylnaphthalene, 2-methylstyrene, 4-phenylstyrene, 3-methylstyrene, and the like. Some representative examples of polydiene rubbers that can be modified by utilizing the procedure of this invention include polybutadiene, styrene-butadiene rubber (SBR), synthetic polyisoprene, natural rubber, isoprene-butadiene rubber, isoprene-butadiene-styrene rubber, nitrile rubber, carboxylated nitrile rubber, and EPDM rubber. Preferably, the sulfur vulcanized rubber is natural rubber, synthetic polyisoprene, and cis-1,4-polybutadiene.

The polyether block amides used herein are, more specifically, polyether-ester-amide sequence copolycondensates containing chains consisting of recurrent units with the formula:

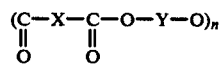

where
X is the polyamide sequence resulting from the loss of two carboxylic functions from the dicarboxylic polyamide;
Y is the polyoxyalkylene glycol sequent resulting from the loss of the two hydroxylated groups at the chain-ends of the polyoxyalkylene glycol, and n is the number of recurrent units forming the sequence copolycondensate chain. Preferably, n is an integer ranging from about 1.0 to 20.

More specifically the copolycondensate is a product obtained from copolymerization of a $\alpha,\beta$dicarboxylic polyamide or copolyamide having a molecular weight comprised between 300 and 15,000, preferably between 800 and 5,000, amounting to 95 to 15% by weight and a $\alpha,\beta$ dihydroxy aliphatic polyoxyalkylene having a molecular weight of 100 to 6,000, preferably between 200 to 3,000, amounting to 5 to 85% by weight, the said product having a melting point between 80° and 210° C., and preferably between 100° and 150° C., and a molten state viscosity of 10 to 2000 Pa. sec. at 200° C.

Preferred polycondensates for use herein are the polyetheresteramide sequences formed from a prepolymer of caprolactam, dodecalactam and adipic and condensed with polyoxypropyleneglycol; a prepolymer of caprolactam, 11amino-undecanoic acid and adipic acid condensed with polyoxytetramethyleneglycol and polyoxypropylene glycol; or a prepolymer of dodecalactam and adipic acid condensed with polyoxytetramethyleneglycol.

These polyether ester amide copolycondensates may be prepared using the methods described in U.S. Pat. Nos. 4,208,493, 4,230,838, 4,252,920, and 4,361,680, the disclosures of which are included herein by reference. Alternatively, the polyether amide may be obtained from ATO Chimie under the tradename Pebax ®. Representative grades of PEBAX ® polyether ester amides include PEBAX ® 2533, PEBAX ® 3533, PEBAX ® 4011, PEBAX ® 4033, PEBAX ® 5512, PEBAX ® 5533, PEBAX ® 5562, PEBAX ® 6312, and PEBAX ® 6333 The PEBAX ® compositions designated 2533, 3533, 4033 and 5533 are based on nylon-12 and polytetramethylene glycol and have Shore D hardness of 25, 35, 40 and 55, respectively. The material designated PEBAX ® 4011 is based on nylon-6 and polyethylene glycol, and has a Shore D hardness of 40. The PEBAX ® designations 5512 and 6312 refer to materials based on nylon-6 and polypropylene glycol, with Shore D hardnesses of 55 and 63. Particularly useful is the grade designated PEBAX ® 5512 which has a melting point of 195° C. and a shore hardness of 55D. The poly(ether block amide) copolycondensate is used in the present compound in an amount of 5 to 60 phr (based on 100 parts of rubber). Preferably the polyether ester amide is present in an amount ranging from about 10 to 30 phr.

The vulcanization of the rubber containing compound is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.0 to 2.25 being preferred.

It may be preferable, depending on the application, to use a grafting agent for the rubber and the polyether ester amide. One example of a suitable grafting agent is a dithio diacid.

The dithio diacids which may be utilized as a grafting agent for in modifying the polydiene rubber and polyether ester amides of the formula:

HOOC-A-S-S-A-COOH wherein A represents an alkylene group containing from 1 to about 10 carbon atoms. Some representative examples of such dithio diacids include dithio diacetic acid, dithio dipropanoic acid, dithio dibutanoic acid, dithio dipentanoic acid, and dithio dihexanoic acid. Dithio dipropanoic acid is the most highly preferred of the dithio diacids. The amount of dithio diacid utilized will typically be within the range of about 0.1 phr to about 10 phr. In most cases it will be preferred to utilize from about 0.5 phr to 3 phr. It is generally most preferred to utilize from about 0.8 phr to about 2 phr of the dithio diacid.

The utilization of mercaptans in chemical processes is generally associated with undesirable odors. However, dithio diacids can be utilized with virtually no undesirable odors being generated. Additionally, dithio diacids react readily with both the polydiene rubber and the polyether ester amide.

The modified rubber compounds of this invention are preferably prepared by reacting the dithio diacid with the diene derived rubber and the polyether ester amide. This can be accomplished by mixing the dithio diacid homogeneously throughout a blend of the rubber and the polyether ester amide and heating the dithio diacid/polyether ester amide/rubber blend. It is believed that the mercaptan groups on the dithio diacid will add to double bonds present in the rubber and the carboxyl groups in the dithio diacid will react with amine groups present in the polyether ester amide. This reaction causes backbone chains of the polyether ester amide to be grafted onto the backbone of the rubber.

The rubber, polyether ester amide, and optionally the dithio diacid may be combined utilizing several satisfactory techniques. For instance, the dithio diacid, polyether ester amide, and rubber can be simultaneously mixed together and heated to graft the polyether ester amide onto the rubber. In another scenario, the dithio diacid can be reacted with the rubber to produce a rubber having carboxyl groups bound thereto and the rubber can then be subsequently reacted with the polyether ester amide to produce the compound of this invention. In the preferred technique of this invention, the dithio diacid is first reacted with the polyether ester amide to produce a modified polyether ester amide containing mercaptan groups and the modified polyether ester amide is subsequently reacted with the rubber. It is preferred to prereact the dithio diacid with the polyether ester amide in a first reaction step and to subsequently react the reaction product with the rubber because the rubber is subjected to elevated temperatures for a shorter duration of time and accordingly less degradation occurs.

The reaction between the dithio diacid and the polyether ester amide will typically be carried out at a temperature which is within the range of about 150° C. to about 250° C. It will preferably be carried out at a temperature which is within the range of about 150° C. to about 225° C. and will more preferably be conducted at a temperature which is within the range of about 180° C. to about 200° C. The reaction between the rubber and the polyether ester amide will typically be carried out at a temperature which is within the range of about 120° C. to about 250° C. In most cases it will be preferred to carry out the reaction between the dithio diacid and the rubber at a temperature within the range of about 125° C. to about 200° C. with the most preferred temperature range for the reaction being from about 130° C. to about 150° C. In cases where the dithio diacid is reacted with the polyether ester amide and the rubber simultaneously, a temperature which is within the range of about 150° C. to about 250° C. will be utilized. In such cases the simultaneous reaction between the dithio diacid, the polyether ester amide, and the rubber will more preferably be carried out at a temperature which is within the range of about 165° C. to about 200° C. However, reactions between the dithio diacid and the polyether ester amide and reactions between the rubber and modified polyether ester amide containing mercaptan groups will be carried out at a temperature which is at least as high as the melting point of the polyether ester amide. In other words, reactions which are carried out in the presence of polyether ester amide will be conducted at a temperature which is at least as high as the melting point of the polyether ester amide. In most cases, preferred reaction temperatures will be slightly above the melting point of the polyether ester amide.

When used, the dithio diacid is mixed throughout the rubber and/or the polyether ester amide utilizing conventional mixing procedures. For example, the mixing can be carried out in a Banbury mixer or a mill mixer.

Vulcanization of the rubber containing compound of the present invention is generally carried out at conventional temperatures ranging from about 100° C. and 200° C. Preferably, the vulcanization is conducted at temperatures ranging from about 110° C. to 180° C. Any of the usually vulcanization processes may be used such as heating in a process or mold, heating with superheated steam or hot air or in a salt bath.

In addition to the oligomeric maleimide or maleamic acid, other rubber additives may also be incorporated in the rubber compound. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the rubber compound, certain additives mentioned above are commonly used in conventional amounts. Typical additions of carbon black comprise about 20 to 100 parts by weight of diene rubber (phr), preferably 30 to 80 phr. Typical amounts of tackifier resins comprise about 1 to 5 phr. Typical amounts of antioxidants comprise i to about 10 phr. Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 5 to 40 phr. Typical amounts of peptizers comprise 0.1 to 1 phr. The presence and relative amounts of the above additives are not an aspect of the present invention.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates, and xanthates. Preferably, the primary accelerator is a sulfenamide. If a secondary accelerator is used, the secondary accelerator is preferably a guanidine, dithiocarbamate or thiuram compound.

The rubber containing compounds containing the polyether ester amide and dithio diacid may be used in the preparation of composite products including tires, power belts, conveyor belts, printing rolls, rubber shoe heels and soles, rubber wringers, automobile floor mats, mud flaps for trucks, ball mill liners, and the like.

This invention is illustrated by the following working examples which are presented merely for the purpose of illustration and are not to be regarded as limiting the scope of the invention or the manner in which it can be practiced. Unless specifically indicated otherwise, parts and percentages are given by weight.

EXAMPLES 1–4

In the procedure utilized, 200 grams of high cis-1,4-polyisoprene was mixed with 2 grams of dithiodipropionic acid in a laboratory size Brabender TM mixer which was operated at a temperature of 190° C. at an initial speed of 70 rpm which was reduced to 40 rpm after the temperature reached 190° C. The total mixing time was about 5 minutes. During this procedure dithiodipropionic acid reacted with some of the double bonds in the high cis-1,4-polyisoprene to produce a rubber having carboxyl groups bound thereto. In Example 1 200 grams of the modified polyisoprene produced was mixed with 50 grams of PEBAX ® 2533 and 0.80 gram of diaryl p-phenylene diamine in a 280 gram preparative Brabender mixer which was operated at 193° C. for a mixing period of about 5 minutes. In Example 2, the same procedure and components was used except PEBAX ® 4033 was used instead of PEBAX ® 2533. In Example 3, the procedure utilized in Example 1 was repeated except that PEBAX ® 3533 was used instead of PEBAX ® 2533 In Example 4, the procedure utilized in Example 2 was also repeated except that no dithiopropionic acid was used. In Example 5 (Control), the procedure of Example 1 was repeated except 50 grams of nylon.12 was used. In Example 6 (Control), the procedure of Example 4 was used except no PEBAX ® 4033 was used.

The rubber compositions made were compounded with 45 phr of carbon black, 9 phr of an oil, 2 phr of N-phenyl-N'-(1,3-dimethylbutyl)-p-phenylenediamine, 1 phr of diaryl-p-phenylene diamine, 1 phr of a wax, 3 phr of stearic acid, 3 phr of zinc oxide, 0.8 phr of N-oxydiethylene benzothiazole-2-sulfenamide, 0.4 phr of guanidine, and 1.6 phr of insoluble sulfur. The rubber compositions were then cured at 300° F. (149° C.) for 25 minutes. The 50% modulus, 100% modulus, tensile strength and elongation of the cured rubber samples made are reported in Table I.

TABLE I

| Sample | Modifier | DTBPA[2] | 50% Modulus[3] | 100% Modulus[3] | 300% Modulus | Tensile Strength[3] | Elongation |
|---|---|---|---|---|---|---|---|
| 1 | 2533[1] | 1 | 1.36 | 2.18 | 7.23 | 16.0 | 498% |
| 2 | 4033[1] | 1 | 2.19 | 3.59 | 11.25 | 15.9 | 390% |
| 3 | 5533[1] | 1 | 2.44 | 3.95 | 11.57 | 17.8 | 406% |
| 4 | 4033[1] | — | 1.94 | 3.13 | 9.71 | 17.8 | 458% |
| 5 | Nylon-12 | 1 | 4.69 | 8.95 | — | 13.9 | 177% |
| 6 | — | — | 0.91 | 1.67 | 8.73 | 22.2 | 513% |

[1]Polyether ester amide.
[2]Dithiodipropionic acid (phr).
[3]Given in megapascals.

The polyether ester amide resins provide an improvement in low strain modulus over the control (Sample 6), without the severe loss in ultimate tensile properties observed when a typical nylon resin is used (Sample 5). These polyether ester amide resins provide a reinforcing component in a rubber compound that have a gradient in modulus from the very stiff polyamide segment of the copolymers to the much more flexible rubbery polyether segment of the copolymer, dispersed in a typically softer vulcanized rubber matrix.

The polyether resins may be more compatible, and hence, more easily dispersed in the rubber than 100% polyamide reinforcing resins because of the presence of the soft rubbery segments.

While certain representative embodiments and details have been shown for the purpose of illustrating the subject invention, it will be apparent to those skilled in this art that various changes and modifications can be made therein without departing from the scope of the subject invention.

What is claimed is:

1. A sulfur vulcanized rubber compound comprising:
   (a) a sulfur vulcanized rubber; and
   (b) from about 5 to 60 parts by weight per 100 by weight of rubber of a polyether ester amide;
   (c) from about 0.1 to 10 parts by weight per 100 parts by weight of rubber of a grafting agent selected from the group consisting of at least one dithiodiacid having the structural formula:

HOOC—A—S—S—A—COOH wherein A represents an alkylene group containing from 1 to 10 carbon atoms.

2. The sulfur vulcanized rubber compound of claim 1 wherein said rubber is selected from the group consisting of polybutadiene, styrene-butadiene rubber, synthetic polyisoprene, natural rubber, isoprenebutadiene rubber, isoprene-butadiene-styrene rubber, nitrile rubber, carboxylated nitrile rubber and EPDM.

3. The sulfur vulcanized rubber compound of claim 2 wherein said rubber is synthetic polyisoprene.

4. The sulfur vulcanized rubber compound of claim 1 wherein said dithio diacid is selected from the group consisting of dithio diacetic acid, dithio dipropionic acid, dithio dibutanoic acid, dithio dipentanoic acid and dithio dihexanoic acid.

5. The sulfur vulcanized rubber compound of claim 6 wherein said dithio diacid is dithio dipropionic acid.

6. The sulfur vulcanized rubber compound of claim 1 wherein from 10 to 30 parts by weight per 100 parts by weight of rubber of said polyether ester amide is used.

7. The sulfur vulcanized rubber compound of claim 1 wherein from about 0.5 to 3 parts by weight per 100 parts of rubber of said grafting agent is used.

8. The sulfur vulcanized rubber compound of claim 1 wherein said polyether ester amide is a sequence copolycondensate containing chains consisting of recurrent units with the formula:

$$(\overset{\text{C}}{\underset{\text{O}}{\|}}-\text{X}-\overset{\text{C}}{\underset{\text{O}}{\|}}-\text{O}-\text{Y}-\text{O})_n$$

where
X is the polyamide sequence resulting from the loss of two carboxylic functions from a dicarboxylic polyamide;
Y is the polyoxyalkylene glycol sequence resulting from the loss of the two hydroxylated groups at the chain-ends of a polyoxyalkylene glycol, and
n is the number of recurrent units forming the sequence copolycondensate chain.

* * * * *